United States Patent
Güner

(10) Patent No.: US 9,936,525 B2
(45) Date of Patent: Apr. 3, 2018

(54) METHOD FOR TRANSMITTING MESSAGES IN AD HOC NETWORKS

(71) Applicant: Kapsch TrafficCom AG, Vienna (AT)

(72) Inventor: Refi-Tugrul Güner, Baden (AT)

(73) Assignee: Kapsch TrafficCom AG, Vienna (AT)

( * ) Notice: Subject to any disclaimer, the term of this patent is extended or adjusted under 35 U.S.C. 154(b) by 112 days.

(21) Appl. No.: 14/480,059

(22) Filed: Sep. 8, 2014

(65) Prior Publication Data
US 2015/0078291 A1    Mar. 19, 2015

(30) Foreign Application Priority Data
Sep. 16, 2013 (EP) .................................... 13184622

(51) Int. Cl.
| | |
|---|---|
| *H04W 28/02* | (2009.01) |
| *H04J 3/14* | (2006.01) |
| *H04W 74/08* | (2009.01) |
| *H04W 84/18* | (2009.01) |

(52) U.S. Cl.
CPC ..... *H04W 74/0891* (2013.01); *H04W 74/085* (2013.01); *H04W 84/18* (2013.01)

(58) Field of Classification Search
CPC .......................... H04W 74/0891; H04W 84/18
USPC ....... 370/328, 329, 336, 337, 503, 311, 476, 370/229, 252; 455/95, 500, 507, 509; 701/301
See application file for complete search history.

(56) References Cited

U.S. PATENT DOCUMENTS

| | | | |
|---|---|---|---|
| 8,737,365 B2* | 5/2014 | Parolari et al. | ............... 370/337 |
| 2007/0135041 A1* | 6/2007 | Sawada et al. | ............. 455/12.1 |
| 2008/0097700 A1* | 4/2008 | Grimm | ....................... 701/301 |
| 2009/0232038 A1* | 9/2009 | Gonzalez-Velazquez | H04B 7/2656 370/311 |

(Continued)

FOREIGN PATENT DOCUMENTS

WO    2007/054874 A2    5/2007

OTHER PUBLICATIONS

Sundar Subramanian et al., "Congestion Control for Vehicular Safety: Synchronous and Asynchronous MAC Algorithms"—Jun. 25, 2012, pp. 63-72.*

(Continued)

*Primary Examiner* — Alpus H Hsu
*Assistant Examiner* — Camquyen Thai
(74) *Attorney, Agent, or Firm* — Fiala & Weaver P.L.L.C.

(57) ABSTRACT

A method provides for wireless transmission and reception of messages in an asynchronous ad hoc network having multiple network nodes, of which at least a first network node periodically transmits messages with a predefined period length. A second network node carries out: Defining two consecutive time intervals, each having the length of one period and a first time interval being past and a second time interval being future; subdividing the time intervals into two time slots each; calculating an occupancy for each time slot of the first time interval based on the number of messages of other network node(s) received in this time slot; identifying the time slot having the lowest occupancy; and transmitting a message in a time slot of the second time interval that corresponds to the identified time slot. The exact transmission point is defined on the basis of the time stamp derived from the synchronized TSF.

15 Claims, 3 Drawing Sheets

(56) References Cited

U.S. PATENT DOCUMENTS

| | | | |
|---|---|---|---|
| 2010/0046449 A1* | 2/2010 | Denteneer et al. | 370/329 |
| 2010/0220747 A1* | 9/2010 | Carbunar | H04W 74/04 |
| | | | 370/503 |
| 2010/0226317 A1* | 9/2010 | Horn et al. | 370/329 |
| 2012/0155318 A1* | 6/2012 | Zhang et al. | 370/252 |
| 2012/0182867 A1 | 7/2012 | Farrag et al. | |
| 2013/0034054 A1* | 2/2013 | Wu et al. | 370/328 |
| 2013/0203427 A1* | 8/2013 | Hoyhtya et al. | 455/450 |
| 2013/0208708 A1* | 8/2013 | Nezou et al. | 370/336 |
| 2013/0282357 A1* | 10/2013 | Rubin et al. | 703/22 |

OTHER PUBLICATIONS

Extended Search Report received for European Patent Application No. 13184622.2, dated Apr. 4, 2014, 8 pages.
Park et al., "Collision Control of Periodic Safety Messages With Strict Messaging Frequency Requirements", IEEE Transactions on Vehicular Technology, vol. 62, No. 2, Feb. 2013, pp. 843-852.
Alonso et al., "Throughput of Self-Organizing Time Division Multiple Access MAC Layer for Vehicular Networks Based on Measured SNR time-series", IEEE, vehicular technology conference, 2011, 5 pages.
Tian et al. "A Self-Adaptive V2V Communication System with DSRC", IEEE International Conference on Green Computing and Communications and IEEE internet of Things and IEEE cyber, Physical and social computing, 2013, pp. 1528-1532.

* cited by examiner

METHOD FOR TRANSMITTING MESSAGES IN AD HOC NETWORKS

CROSS-REFERENCE TO RELATED APPLICATION(S)

This application claims priority to European Patent Application No. 13 184 622.2, filed on Sep. 16, 2013, the entirety of which is incorporated by reference herein.

BACKGROUND

Technical Field

The present subject matter relates to a method for the wireless transmission and reception of messages in an asynchronous ad hoc network having a plurality of network nodes, at least one network node of which periodically transmits messages with a predefined period length. The invention further relates to a network node for such a method.

Background Art

Ad hoc networks for the wireless transmission and reception of messages are used, e.g., in vehicle-to-vehicle (V2V) or vehicle-to-infrastructure (V2I) communication; they are highly flexible and, due to the intermeshing of the network nodes, are failsafe. However, since every network node initiates the transmission of messages on the basis of its own internal timing, collisions occur when two or more network nodes attempt to transmit messages simultaneously. For this reason, methods for collision detection (CD) and collision avoidance (CA) are standardized for such networks having Carrier Sense Multiple Access (CSMA). These methods are inadequate, however, in the case of a large number of network nodes and/or messages, in particular: the number of successfully transmitted messages and, therefore, the efficiency of the network decreases as the number of messages increases.

Various improvements for counteracting this are known from the literature. In G. Bansal et al., "Cross-Validation of DSRC Radio Testbed and NS-2 Simulation Platform for Vehicular Safety Communications", 2011 IEEE Vehicular Technology Conference (VTC Fall), it is proposed to reduce the transmit power of the network nodes or extend the period length of messages to be periodically transmitted in order to reduce the number of collisions. As a result thereof, the number of directly interconnected network nodes of an ad hoc network diminishes, however, and therefore messages can no longer be transmitted directly ("single hop"), but rather must be routed through a plurality of intermediate network nodes ("multi-hop"), which further increases the total number of transmitted messages; another result thereof is that the propagation speed of information is reduced, which is undesired in the case of important messages in particular, e.g., messages related to dangerous situations or accidents.

In S. Sundar et al., "Congestion Control for Vehicular Safety: Synchronous and Asynchronous MAC Algorithms", VANET'12 Conference, Jun. 25, 2012, UK, it is proposed, in contrast, that the network nodes be synchronized, which requires a complex synchronization algorithm, which must also handle the addition or removal of individual network nodes in the entire ad hoc network, and requires a precise, common time base of one GPS receiver in every network node. It is understood that such a method functions only when all participating network nodes of the ad hoc network are gaplessly synchronized, i.e., when the ad hoc network is completely covered with such network nodes.

BRIEF SUMMARY

It is an object of the disclosed subject matter is to create a method and a network node for the wireless transmission and reception of messages in an asynchronous ad hoc network, which permits efficient transmission even in the presence of a large number of network nodes or messages without the requirement for complexity and complete implementation of a synchronization.

According to a first aspect of the disclosed subject matter, the object is achieved with a method for the wireless transmission and reception of messages in an asynchronous ad hoc network having a plurality of network nodes, of which at least a first network node periodically transmits messages with a predefined period length, said method being distinguished by the following steps, which are carried out in a second network node:

Defining at least two consecutive time intervals, each of which having the length of one period, of which a first time interval is in the past and a second time interval is in the future, and subdividing the time intervals into at least two time slots each;

Calculating an occupancy for each time slot of the first time interval on the basis of the number of messages of one or more other network nodes received in this time slot;

Identifying the time slot having the lowest occupancy; and

Transmitting at least one message in a time slot of the second time interval that corresponds to the identified time slot.

The disclosed subject matter is based on the finding that, as a consequence of messages from various network nodes being transmitted periodically in generally with the same period length—e.g., Common Awareness Messages (CAM) or Basic Safety Messages (BSM) are typically transmitted once every 100 ms to 500 ms, according to the ITS-G5 or WAVE standards—a high risk of secondary collisions results from the fact that two network nodes, the messages of which have already previously collided, simultaneously make another attempt to transmit after the identical period lengths expire.

The method uses time slots for the transmission of messages which, on the basis of the observation of the past, are also highly likely to be free in the future, thereby preventing collisions with messages of other network nodes. The transmit power and period length remain untouched, and therefore efficiency is not compromised. Since the network nodes remain independent of one another, the method can be used equally advantageously in an ad hoc network in which said method is used by all, a few, or none of the other network nodes. In this case, each network node carries out its own pseudo synchronization, without the complex synchronization of all network nodes of the ad hoc network.

Particularly favorably, the received signal strengths of the received messages are measured and, when calculating the occupancy, every received message is counted, being weighted with the received signal strength thereof. Therefore, more remote network nodes are factored into the calculation of the occupancy to a lesser extent, thereby making it possible to determine, on the basis of the occupancy, time slots having less of a risk of collision in cases of very high occupancy of the time intervals in particular. In this case, a network node can transmit its message even while receiving a message having a lower received signal strength, and said transmitted message can be received by adjacent network nodes without interference.

In one simple embodiment, the period length is defined for the entire ad hoc network. As an alternative, the period length can be measured on the basis of the message received from the first network node. The second network node therefore adapts itself to the period length of the first network node; the method is therefore more robust against network nodes having a different predefined period length. The network node selected as the first network node is the network node of the ad hoc network that has the lowest relative velocity with respect to the second network node. The second network node therefore adapts itself to a network node the messages of which are expected to be received in a consistent manner over a relatively long period of time.

Since the periodic messages in the ad hoc networks under consideration typically have a duration of approximately 0.5 to 1 ms given a typical period length of 100 ms to 500 ms, a favorable resolution is obtained when the time intervals are each subdivided into 10 to 500, e.g., 20 to 100 time slots in embodiments.

In embodiments, received messages are provided with a time stamp of a Timing Synchronization Function (TSF) according to the IEEE 802.11 standard or a standard compatible therewith, and the transmission of messages is synchronized therewith. Therefore, a timer that is already present is used, which, by default, even implements an alignment with Timing Synchronization Functions of other networks and can time-stamp received messages directly in the MAC sublayer of the OSI layer model described in the IEEE 802.11 standard and, therefore, practically without delay. At the same time, the Timing Synchronization Function allows a transmission of messages that is synchronized with reception, thereby eliminating a separate, second timer for initiating the transmission and preventing deviations occurring between two timers of a network node.

The aforementioned periodic messages that are transmitted are, e.g., Common Awareness Messages (CAM), Basic Safety Messages (BSM), Traveler Information Messages (TIM) and/or Decentralized Environmental Notification Messages (DENM) according to the ITS-G5 or WAVE standards or a standard compatible therewith. The method therefore does not require any further messages, which increase occupancy, in the pseudo synchronization thereof, and is therefore also fully compatible with conventional, standard-compliant network nodes.

In a second aspect, the disclosed subject matter creates a network node for an asynchronous ad hoc network having a plurality of network nodes, at least one network node of which periodically transmits messages with a predefined period length, comprising:

a transceiver for the wireless transmission and reception of messages;

a processor connected to the transceiver, said processor being configured to define at least two consecutive time intervals, each of which having the length of one period, of which a first time interval is in the past and a second time interval is in the future, said processor also being configured to subdivide the time intervals into at least two time slots each, to calculate an occupancy for each time slot of the first time interval on the basis of the number of messages of one or more other network nodes received in this time slot via the transceiver, to identify the time slot having the lowest occupancy, and to transmit, via the transceiver, at least one message in a time slot of the second time interval corresponding to the identified time interval.

Reference is made to the aforementioned embodiments of the method regarding the advantages and further example embodiments of the network node.

Further features and advantages, as well as the structure and operation of various embodiments, are described in detail below with reference to the accompanying drawings.

BRIEF DESCRIPTION OF THE DRAWINGS/FIGURES

The present subject matter is explained in the following in greater detail with reference to exemplary embodiments illustrated in the accompanying drawings. In the drawings.

Embodiments will now be described with reference to the accompanying drawings.

DETAILED DESCRIPTION

Figure 1:
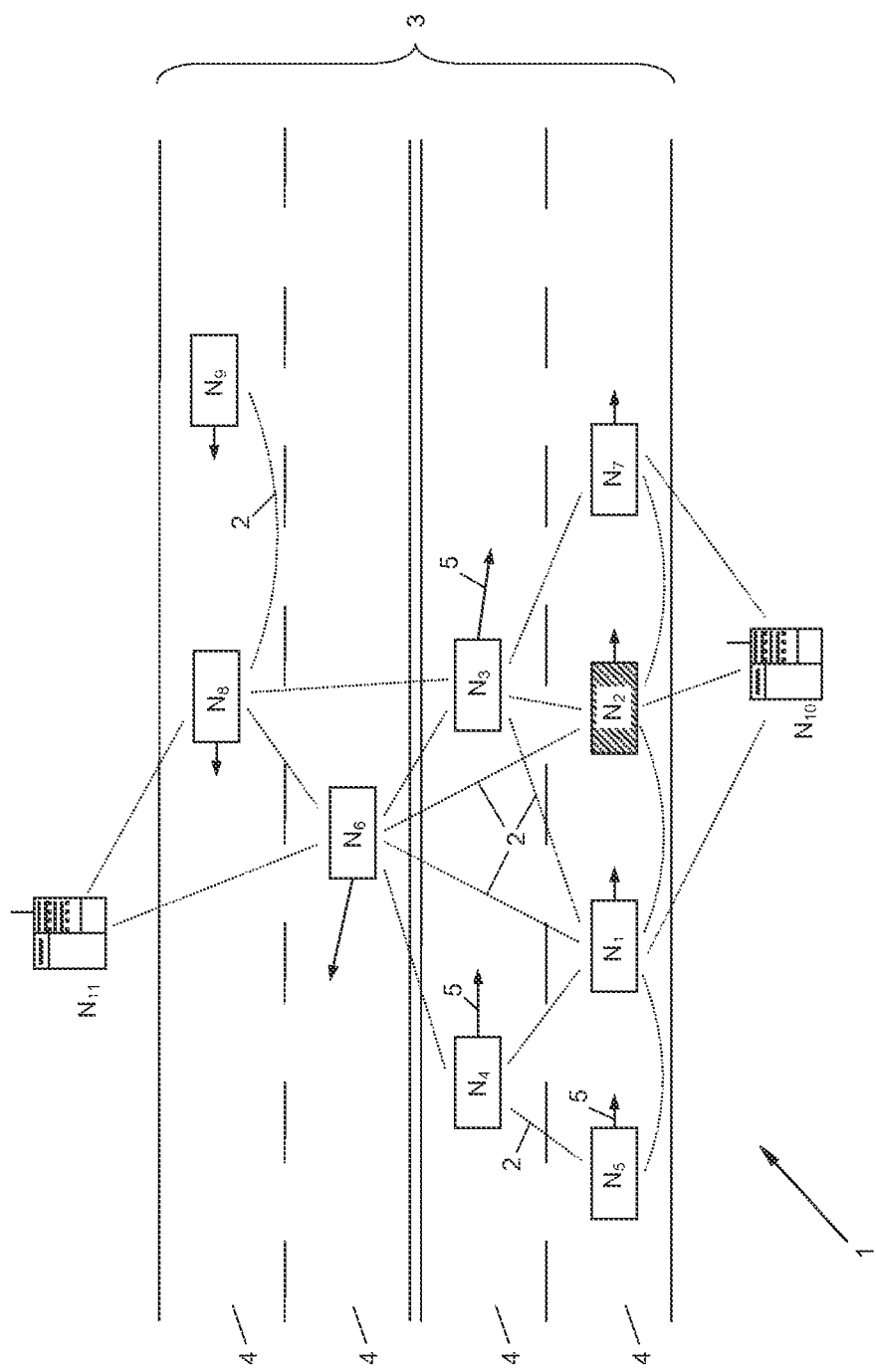
FIG. 1 shows an asynchronous ad hoc network having a plurality of network nodes, in a schematic top view.

According to FIG. 1, a plurality of network nodes $N_1$, $N_2$, ..., in general $N_i$, communicate with each other in an asynchronous ad hoc network 1 via short range wireless links 2. Some of the network nodes $N_i$ are mobile, e.g., vehicles on a roadway 3 having lanes 4 in which the vehicles or network nodes $N_1$ to $N_9$ each travel at a speed in a direction, i.e., according to a velocity vector 5. Other network nodes $N_{10}$, $N_{11}$ are stationary, e.g., are installed on the side of the roadway 3 or above said roadway 3.

According to the nature of an ad hoc network 1, the short range wireless links 2 are dynamically established or terminated when two network nodes $N_i$ enter or leave, respectively, the radio range of the other network node.

Figure 2A:
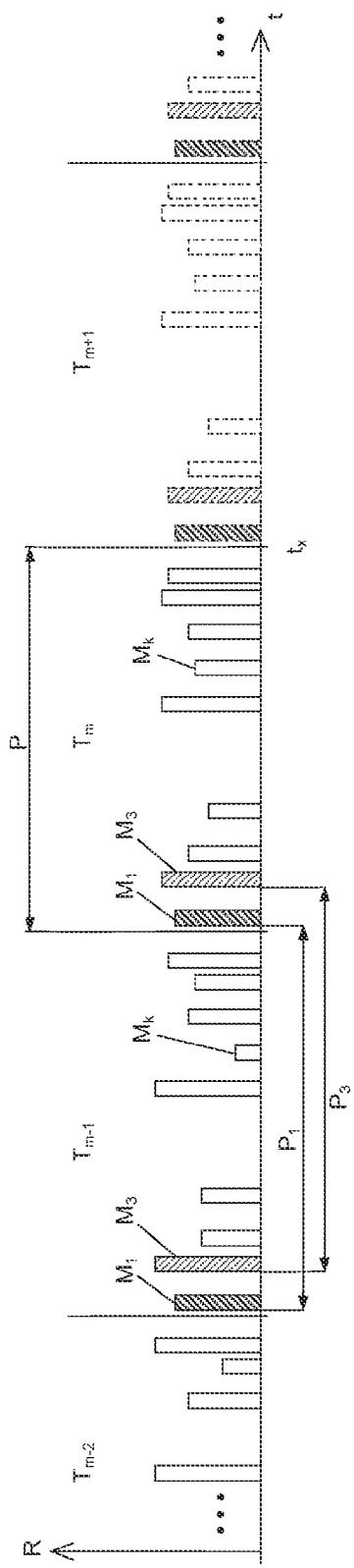
FIGS. 2a and 2b show exemplary time intervals and messages received therein, without (FIG. 2a) and with (FIG. 2b) subdivision into time slots according to the invention, in the form of a received signal strength/time diagram.

According to FIG. 2a, the network nodes $N_i$ shown in FIG. 1 each send and receive messages $M_1$, $M_2$, ..., in general $M_i$, via the radio links 2 to or from another network node or other network nodes $N_i$ located within the radio range thereof. The messages $M_i$ can be periodic or one-time messages; as shown in the examples illustrated in FIGS. 1 and 2a, for example, a first network node $N_1$ periodically transmits messages $M_1$ with a predefined period length $P_1$ of 100 ms, for example, said messages being received by the network nodes $N_2$ to $N_6$ and $N_{10}$. One network node $N_3$ periodically transmits messages $M_3$ with a predefined period length $P_3$, which, in this example, corresponds to the period length $P_1$ of the network node $N_1$, said messages being received in the network nodes $N_1$, $N_2$ and $N_6$ to $N_8$, for example.

The periodically transmitted messages $M_i$ of the network nodes $N_i$ can be, for example, Common Awareness Messages (CAM), Basic Safety Messages (BSM), Traveller Information Messages (TIM) or Decentralized Environmental Notification Messages (DENM) according to the ITS-G5 or WAVE standards or a standard that is compatible therewith; one-time messages $M_i$ are each triggered by a specific event that is detected in a network node $N_i$, e.g., a traffic accident.

Figure 2B:
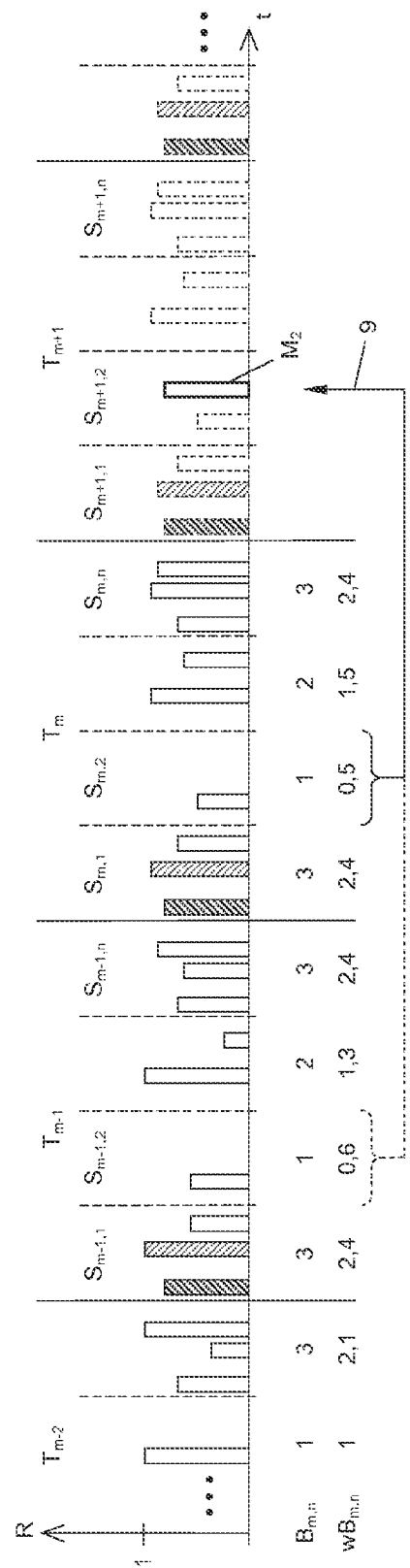
Figure 3:
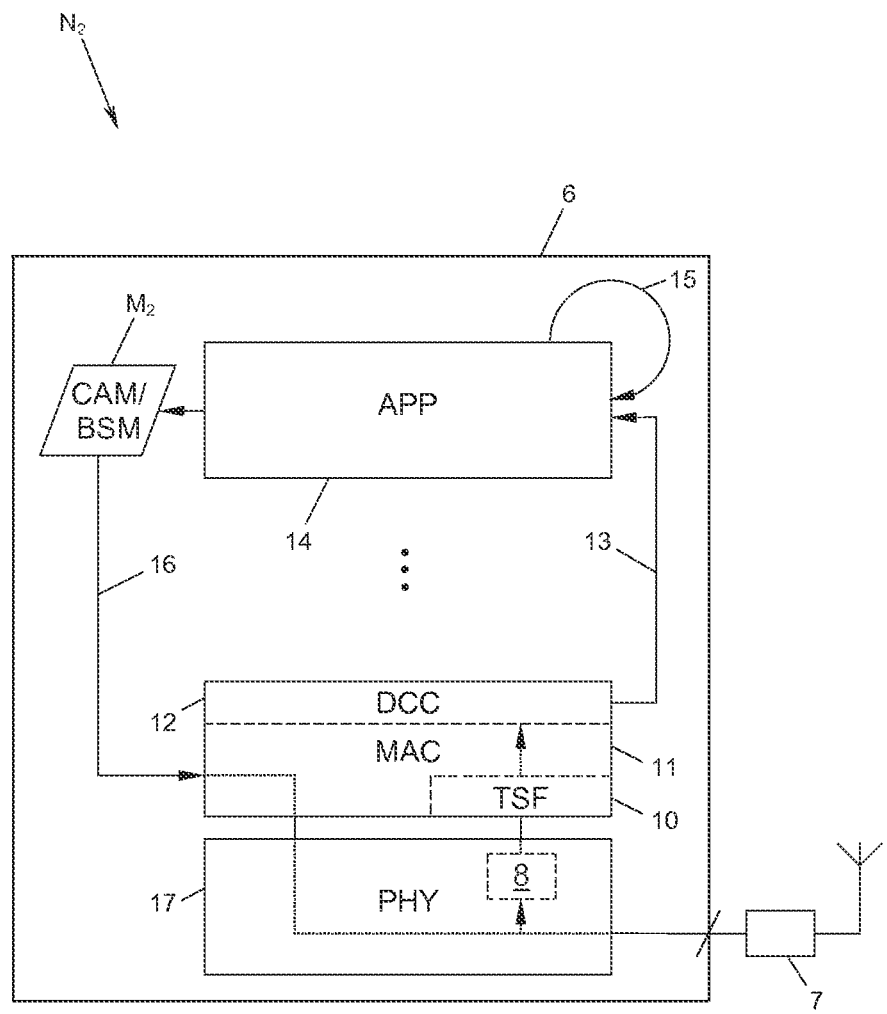
FIG. 3 shows a network node according to the invention having sections of an OSI layer model, in a schematic block diagram with signal flows.

According to FIG. 3, one or more network nodes $N_i$, namely the second network node $N_2$ in this case, have a processor 6, a transceiver 7 connected thereto for sending and receiving the messages $M_i$, and a measuring device 8 connected to both for measuring the received signal strengths $R_1, R_3, \ldots$, in general $R_k$, of messages $M_1$, $M_3, \ldots$, in general $M_k$, received from other network nodes $N_1, N_3, \ldots$, in general $N_k$, which are plotted as received signal strength R over time t in FIGS. 2a and 2b. The second network node $N_2$, which is being considered here, implements the following method in order to minimize the risk of collision of the messages $M_2$ transmitted by said second network node with messages $M_k$ received from the other network nodes $N_k$.

According to the example shown in FIG. 2a, the processor 6 in the second network node $N_2$ defines at least two consecutive time intervals $T_m, T_{m+1}$, each having the length of one period P, wherein, at the time $t_x$ of the determination or observation, the first time interval $T_m$ is located in the past and the second time interval $T_{m+1}$ is located in the future. The length of the period P can be defined for the entire ad hoc network 1 and can therefore apply equally for each network node $N_i$, with the result that the individual period lengths $P_1, P_2, \ldots$, in general $P_i$, implemented in the respective network nodes $N_i$ deviate slightly from one another and from the defined period length P due simply to different local timing in the network nodes $N_i$; as an alternative, as shown in the example illustrated in FIG. 2a, the second network node $N_2$ can measure the period length P on the basis of a period length $P_k$—which is measured by said second network node—of the messages $M_k$ received from another network node $N_k$ ("reference network node"), which is the period length $P_1$ of the first network node $N_1$ in this case, for example. The reference network node $N_1$ that is selected is, e.g., the network node $N_k$ of the ad hoc network 1 that has the lowest relative velocity with respect to the second network node $N_2$, i.e., that has a velocity vector 5 that is most similar to that of the second network node $N_2$.

The relative velocity can be drawn from the respective data on position and the direction and rate of motion, e.g., the CAM or BSM message of the other network nodes $N_k$, or can be determined on the basis of the received signal strengths $R_k$ of messages $M_k$ received from the other network nodes $N_k$ and their changes over time over at least two transpired time intervals $\ldots, T_{m-2}, T_{m-1}, T_m$. In the example illustrated in FIG. 2a, the received signal strengths $R_1, R_3$ of messages $M_1, M_3$ received from the network nodes $N_1$, $N_3$ barely change over a plurality of transpired time intervals $\ldots, T_{m-2}, T_{m-1}, T_m$, although the received signal strength $R_k$ of the message labeled $M_k$ in FIG. 2a clearly increases from the time interval $T_{m-1}$ to the subsequent time interval $T_m$ and, in the time interval $T_{m-2}$ preceding said time intervals, a message $M_k$ of network node $N_k$ had not yet been received.

According to FIGS. 2b and 3, the time intervals $T_m$ defined by the processor 6 of the network node $N_2$ are each subdivided into at least two, typically into five to one hundred, e.g., ten to twenty in embodiments—four according to the example in FIG. 2b—time slots $S_{m,1}, S_{m,2}, \ldots$, in general $S_{m,n}$. It is understood that the time slots $S_{m,n}$ in a time interval $T_m$ can also be selected so as to have different sizes.

Next, an occupancy $B_{m,n}$ is calculated for each time slot $S_{m,n}$ of the first time interval $T_m$ on the basis of the number of messages $M_k$ of the other network nodes $N_k$ that is received in this time slot $S_{m,n}$ as follows:

$$B_{m,n} = \sum_k M_k(S_{m,n})$$

Messages $M_2$ transmitted by the network node $N_2$ itself can be omitted from this calculation.

Optionally, the processor 6 can count every received message $M_k$, weighted with the received signal strength $R_k$ thereof, when calculating the occupancy in order to generate a weighted occupancy $wB_{m,n}$, into which received messages $M_k$ having a lesser received signal strength $R_k$ are factored to a lesser extent:

$$wB_{m,n} = \sum_k R_k \cdot M_k(S_{m,n})$$

The occupancy $B_{m,n}$ or the weighted occupancy $wB_{m,n}$ could also be averaged over the respective nth time slot $\ldots$, $S_{m-2,n}$, $S_{m-1,n}$, $S_{m,n}$ of two or more transpired time intervals $\ldots, T_{m-2}, T_{m-1}, T_m$.

For the time interval $T_m$ a search is now conducted for the time slot $S_{m,n}$ having the lowest occupancy $B_{m,n}$ or $wB_{m,n}$. In the example illustrated in FIG. 2b, this is the time slot $S_{m-2}$.

Next, the second network node $N_2$ transmits at least one message $M_2$ in a time slot $S_{m+1,2}$ of the second time interval $T_{m+1}$ corresponding to the thusly identified time slot $S_{m,2}$ of the transpired ("first") time interval $T_m$ or starts or shifts a periodic transmission of messages $M_2$ in this or these time slot(s) $S_{m+1,2}$, as symbolized by arrow 9 in FIG. 2b.

This is based on the assumption or the expected value that—since several messages $M_i$ are transmitted periodically in the ad hoc network 1—messages $M_k$ received in the time interval $T_m$ are followed by corresponding messages $M_k$ in the subsequent time interval $T_{m+1}$, and, in fact, each in the same time slots $S_{m+1,n}$ of the interval $T_{m+1}$ corresponding to the time slots $S_{m,n}$ of the time interval $T_m$, as indicated in FIG. 2b with dashed lines. As an alternative, the time slot $S_{m+1,n}$ of the second time interval $T_{m+1}$ for the transmission of the message $M_2$ could also be determined on the basis of a time interval further in the past $\ldots, T_{m-2}, T_{m-1}$, e.g., on the basis of an ascertained time slot $S_{m-1,2}$ of the time interval $T_{m-1}$.

If desired, at least one time slot $S_{m,n}$ in each time interval $T_m$ can be reserved for other services or for messages $M_i$ having special priority.

In one practical embodiment, as shown in FIG. 3, the processor 6 provides each received message $M_k$, upon receipt, with a current time stamp of a Timing Synchronization Function (TSF) 10, which is disposed in the MAC sublayer 11 of the OSI layer model, according to the IEEE 802.11 standard or a standard compatible therewith, e.g., the IEEE 802.11p standard for ad hoc networks 1 of intelligent traffic systems. Therefore, received messages $M_k$ can be assigned at any time to the time slots $S_{m,n}$ formed there. As an alternative, the processor 6 could also provide messages $M_k$ with a time stamp on the basis of another timer.

The messages $M_k$ provided with time stamps are forwarded via a path 13 for processing, up to the application layer (APP) 14, via a Decentralized Congestion Control (DCC) module 12 of the MAC sublayer 11, which is also described in the aforementioned standards.

Furthermore, the processor 6 according to FIG. 3 synchronizes the transmission of the at least one message $M_2$ with the timing of the Timing Synchronization Function 10, wherein the application layer 14 waits (15) for the time slot $S_{m+1,2}$. By transferring the message $M_2$, e.g., a CAM or BSM message, to the MAC sublayer 11, see path 16, and to a physical layer (PHY) 17 located thereunder, according to the OSI layer model, the processor 6 initiates the transmission thereof and, in fact, at the time of the time slot $S_{m+1,2}$ of the future ("second") time interval $T_{m+1}$ indicated on the basis of the Timing Synchronization Function 10. According to the standards, the two layers, MAC 11 and PHY 17, send the transferred message $M_2$ as soon as possible, i.e., via the transceiver 7 of the network node $N_2$ if no further messages $M_i$ are received.

If a collision with a message $M_k$ of another network node $N_k$ still happens to occur during transmission, e.g., because this network node $N_k$ was not in the reception range of the second network node $N_2$ in the first time interval $T_m$ or said network node $N_k$ transmits an additional message $M_k$, the mechanisms of collision detection (CD) or collision avoidance (CA) known for networks 1 having Carrier Sense Multiple Access (CSMA) are implemented.

CONCLUSION

The invention is not limited to the embodiments presented and, instead, comprises all variants and modifications that fall within the scope of the claims, which follow.

What is claimed is:

1. A method for wireless transmission and reception of messages in an asynchronous ad hoc network having a plurality of network nodes, wherein each network node of said plurality of network nodes initiates the transmission of messages on the basis of its own independent internal timing, and wherein at least a first network node of said plurality of network nodes periodically transmits messages with a predefined individual period length, said method comprising the following steps, which are carried out in a second network node:
    defining at least two consecutive time intervals based on the independent internal timing of the second network node, each of which having a length of an interval period length, of which a first time interval is in the past and a second time interval is in the future, and subdividing the at least two consecutive time intervals into at least two time slots each;
    calculating an occupancy for each time slot of the first time interval on the basis of a number of messages of one or more other network nodes received in each respective time slot of the first time interval, wherein received signal strengths of the received messages are measured and, when calculating the occupancy for each time slot of the first time interval, every received message is counted, being weighted with the received signal strength of the received messages respectively such that ones of the received messages having a lesser received signal strength are factored to a lesser extent;
    identifying a time slot of the first time interval having a lowest occupancy; and
    transmitting at least one message in a time slot of the second time interval that corresponds to the identified time slot of the first time interval.

2. The method according to claim 1, wherein the individual and the interval period lengths are defined for the entire ad hoc network.

3. The method according to claim 1, wherein the interval period length is measured on the basis of a message received from the first network node.

4. The method according to claim 3, wherein the network node selected as the first network node is the network node of the ad hoc network that has a lowest relative velocity with respect to the second network node.

5. The method according to claim 1, wherein the at least two consecutive time intervals are each subdivided into 10 to 500 time slots.

6. The method according to claim 1, wherein the at least two consecutive time intervals are each subdivided into 20 to 100 time slots.

7. The method according to claim 1, wherein the received messages are provided with a time stamp of a Timing Synchronization Function according to an IEEE 802.11 standard or a standard compatible with the IEEE 802.11 standard, and the transmission of the at least one message is synchronized with the time stamp.

8. The method according to claim 1, wherein the periodic messages that are transmitted are one or more of Common Awareness Messages, Basic Safety Messages, Traveler Information Messages and Decentralized Environmental Notification Messages according to Intelligent Transportation Systems G5 (ITS-G5) or Wireless Access in Vehicular Environments (WAVE) standards or a standard compatible with the ITS-G5 or WAVE standards.

9. A network node for an asynchronous ad hoc network having a plurality of network nodes, wherein each network node of said plurality of network nodes initiates the transmission of messages on the basis of its own internal timing, and wherein at least one network node of said plurality of network nodes periodically transmits messages with a predefined individual period length, comprising:
    a transceiver for wireless transmission and reception of the messages;
    a processor connected to the transceiver, and
    a measuring device, which is connected to the processor, for measuring received signal strengths of the received messages;
    said processor being configured
        to define at least two consecutive time intervals based on the independent internal timing of the at least one network node, each of which having a length of an interval period length, of which a first time interval is in the past and a second time interval is in the future, and to subdivide the at least two consecutive time intervals into at least two time slots each,
        to calculate an occupancy for each time slot of the first time interval on the basis of a number of messages of one or more other network nodes received in each respective time slot of the first time interval via the transceiver by counting and weighting every received message with the received signal strength of the received messages respectively such that ones of the received messages having a lesser received signal strength are factored to a lesser extent,
        to identify a time slot of the first time interval having a lowest occupancy, and
        to transmit, via the transceiver, at least one message in a time slot of the second time interval corresponding to the identified time slot of the first time interval.

10. The network node according to claim 9, wherein the individual and the interval period lengths are defined for the entire ad hoc network.

11. The network node according to claim 9, wherein the processor is configured to measure the interval period length on the basis of the messages of the number of messages received from a network node of the one or more other network nodes.

12. The network node according to claim 11, wherein the processor is further configured to select the network node of the one or more other network nodes of the ad hoc network as a network node that has a lowest relative velocity with respect to the network node.

13. The network node according to claim 9, wherein the processor is configured to subdivide each of the at least two consecutive time intervals into 10 to 500 time slots.

14. The network node according to claim 9, wherein the processor is configured to subdivide each of the at least two consecutive time intervals into 20 to 100 time slots.

15. The network node according to claim 9, wherein the processor is further configured to provide the received messages with a time stamp of a Timing Synchronization Function according to an IEEE 802.11 standard or a standard compatible with the IEEE 802.11 standard, and to synchronize the transmission of messages with the time stamp.

* * * * *